US005619181A

United States Patent [19]

Murray

[11] Patent Number: 5,619,181

[45] Date of Patent: Apr. 8, 1997

[54] VIBRATORY ALERTING DEVICE WITH AUDIBLE SOUND GENERATOR

[75] Inventor: Bradley A. Murray, West Palm Beach, Fla.

[73] Assignee: Motorola, Inc., Schaumburg, Ill.

[21] Appl. No.: 342,469

[22] Filed: Nov. 21, 1994

[51] Int. Cl.$^6$ .................................................. H04B 3/36

[52] U.S. Cl. .................................. 340/407.1; 340/404.2; 340/825.46; 310/81

[58] Field of Search .......................... 340/407.1, 311.1, 340/384.73, 825.46, 404.1, 404.2; 310/81, 316; 446/397, 265; 368/230

[56] References Cited

U.S. PATENT DOCUMENTS

| | | | |
|---|---|---|---|
| 3,623,064 | 11/1971 | Kagan . | |
| 3,911,416 | 10/1975 | Feder . | |
| 4,100,697 | 7/1978 | Ward | 46/269 |
| 4,232,475 | 11/1980 | Bauer | 46/61 |
| 4,297,809 | 11/1981 | Branson | 46/74 D |
| 4,794,392 | 12/1988 | Selinko . | |
| 4,864,276 | 9/1989 | Tribbey et al. | 340/407.1 |
| 4,908,000 | 3/1990 | Counts | 446/216 |
| 4,918,438 | 4/1990 | Yamasaki | 340/407.1 |
| 4,931,765 | 6/1990 | Rollins et al. | 340/407.1 |
| 5,172,092 | 12/1992 | Nguyen et al. | 340/311.1 |
| 5,260,681 | 11/1993 | Asai et al. | 340/311.1 |
| 5,436,622 | 7/1995 | Gutman et al. | 340/407.1 |

*Primary Examiner*—Jeffery Hofsass
*Assistant Examiner*—Daniel J. Wu
*Attorney, Agent, or Firm*—Philip P. Macnak

[57] ABSTRACT

An alerting device for a selective call receiver (100) efficiently generates a tactile vibration alert and an audible alert simultaneously. A vibrator motor (15) includes a modified eccentric weight (14) which becomes an efficient air mover upon being rotated about the axis (13). Integral to the eccentric weight (14) is a sound producing orifice (28). The orifice (28) generates an audible alert in response to air moving either across or through the orifice (28). The audible alert can be selectively enabled by the selective call receiver user, or by the message type received.

5 Claims, 6 Drawing Sheets

VIBRATORY ALERTING DEVICE WITH AUDIBLE SOUND GENERATOR

FIELD OF THE INVENTION

This invention relates in general to vibratory alerting devices and more specifically to a vibratory alerting device which simultaneously generates an audible alert.

BACKGROUND OF THE INVENTION

Portable communication receivers, such as pagers, alert the individual carrying such a device that a message has been received. Typical alerting methods include flashing a light, such as an LED, to indicate a message has been received. However, this method requires the user to visually monitor the pager for incoming messages which is not practical if, for example, the pager is carried in the user's pocket. Another method includes generating an audible alert using a speaker or transducer. The user can then hear when a message is received. However, the audible alert may not be loud enough to alert the user of incoming messages in noisy environments. Yet another method includes silently alerting the user by powering a small electric motor which rotates an unbalanced weight so as to produce vibration. The user can then feel the pager vibrate which indicates a message has been received. However, this method requires the user to be in physical contact with the pager in order to feel the alert. Typical pagers sold today allow a user to choose one of the above described types of alert methods. This is accomplished by placing a switch in one of several predetermined positions so as to choose the type of alert method desired.

Some pager users, such as firemen, cannot risk missing a message given the emergency situations that typically occur with these types of professions. These users would typically desire the audible alert method described above. However, these users may, at times, be in a very noisy environment where they may not hear an audible alert upon receiving a message. These users may then desire to enable the vibratory alert so they can feel the vibration upon receiving a message. This would require the user to place the pager in close contact to the body as described above. However, these users are typically required to change their clothing at a moments notice, such as in a case of a fire. Upon doing this, the user may not always be able to wear the pager in close contact to the body so as to be able to feel the vibratory alert. The user must then change the pager's alert back to the audible alert. This would require the user to remember to change the alert of the pager during these situations. If the user forgets to change the alert, important messages may be missed.

One solution to this problem would be to allow the user to enable both the audible and vibratory alerts at the same time. In other words, power the transducer and vibrator motor at the same time. This would insure that, in the above described situations, the user would be able to detect received messages. However, since small handheld communication receivers, such as pagers, are battery powered, the amount of energy available for the device is limited. The transducer and vibrator motor typically consume the most energy in a paging receiver. Allowing the simultaneous operation of both the audible and vibratory alerts in prior art receivers would therefore severely reduce the life of the battery powering the communication receiver.

What is needed is a vibratory alerting device which efficiently generates an audible alert simultaneously with a vibratory alert.

SUMMARY OF THE INVENTION

In accordance with a first aspect of the present invention, an alerting device for use in a communication device provides a simultaneous audible and vibrating alert and includes a means for rotating a shaft about a first axis of rotation, the means for rotating the shaft is responsive to an alert signal generated in response to received information, and further includes an eccentric weight which is coupled to the shaft and which is rotated about the first axis to generate tactile vibration. The eccentric weight is coupled to an orifice and generates the audible alert by air movement produced in response to the eccentric weight being rotated.

In accordance with a second aspect of the present invention, a communication receiver is enclosed within and coupled to a housing. The communication receiver includes a receiver for receiving information, a decoding means responsive to the received information for generating an alert signal in response thereto, a means for rotating a shaft about a first axis of rotation in response to the alert signal, and an eccentric weight coupled to the shaft and capable of being rotated about the first axis to generate tactile vibration of the housing. The eccentric weight is coupled to an orifice which generates an audible alert in response to the eccentric weight being rotated about the first axis.

In accordance with a third aspect of the present invention, a method for producing a tactile and audible alert in a communication receiver which has a decoder which generates first and second alert signals in response to detecting received information, the method comprises the steps of:

(a) rotating an eccentric weight about an axis at a first rate in response to the first alert signal;

(b) generating a tactile alert upon rotating the eccentric weight at the first rate; and (c) generating an audible alert at an orifice coupled to the eccentric weight by air movement produced in response to the eccentric weight being rotated about the axis at the first rate.

DESCRIPTION OF A PREFERRED EMBODIMENT

Figure 1:
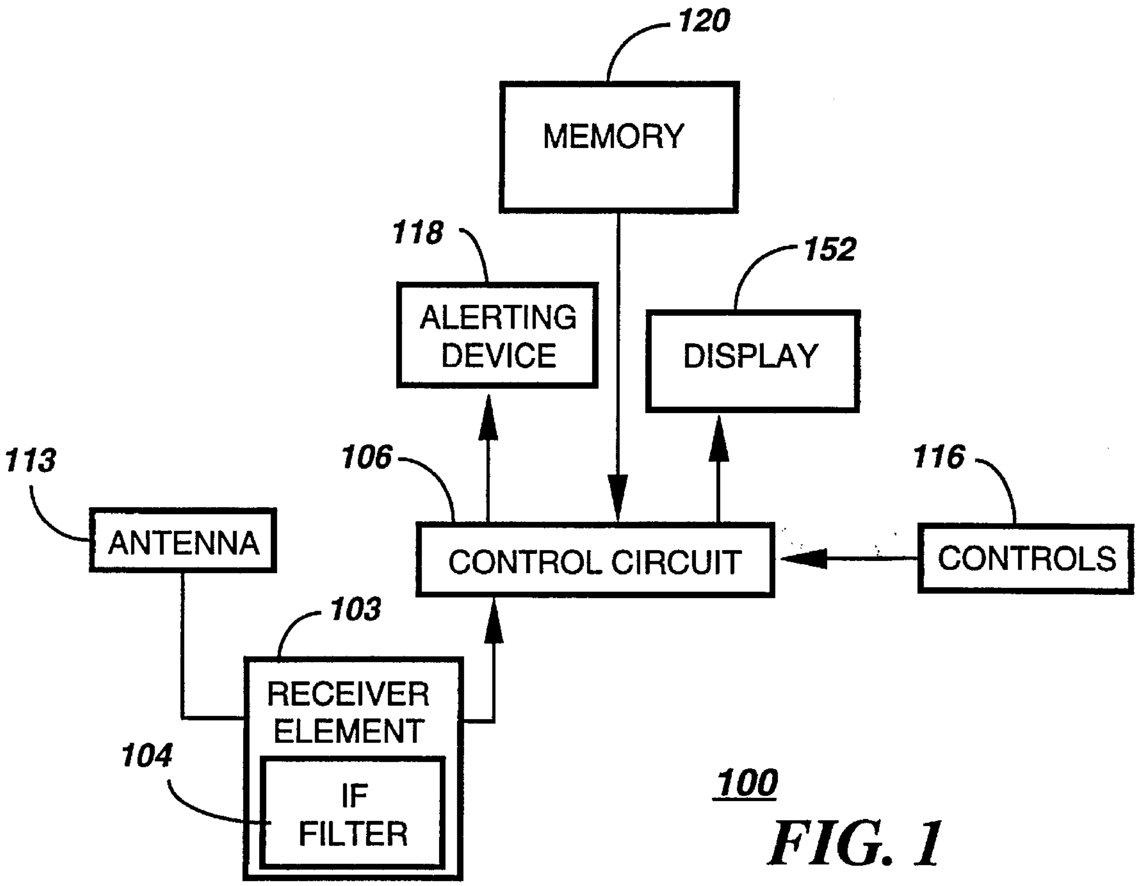
FIG. 1 is an electrical block diagram of a selective call receiver in accordance with the present invention.

Referring now to FIG. 1, an electrical block diagram of a selective call receiver 100 is shown in accordance with the present invention. The selective call receiver 100 operates in a radio communication system to receive a radio signal having a predetermined carrier frequency which is preferably frequency modulated (FM) with a digital signal. The FM radio signal is intercepted using an antenna 113 which is coupled to a receiver element 103. The receiver element 103 operates to amplify, convert, filter, and demodulate the intercepted radio signal. The receiver element 103 comprises an intermediate frequency (IF) filter 104 used for rejecting undesirable frequency components from the intercepted radio signal in a conventional manner well known to one of ordinary skill in the art. The demodulated signal is coupled from the receiver element 103 to a control circuit 106, which includes conventional control logic for decoding the demodulated signal in a manner well known in the art. Control circuit 106 can also be incorporated within a microprocessor or a digital signal processor. The selective call message preferably comprises an address, which is a predetermined pattern of binary data symbols, and may include other information such as a telephone number, alphanumeric data, or graphics. A conventional memory 120, which stores a predetermined address assigned to the selective call receiver, is coupled to the control circuit 106. The control circuit 106 is further coupled to a display 152 and a sensible alerting device 118 such as the vibrator motor of the present invention. The control circuit 106 compares the address recovered from the selective call message to the predetermined address stored in the memory 120 and continues processing the message when the comparison meets predetermined criteria. When the comparison does not meet predetermined criteria, the selective call receiver 100 stops the processing of the selective call message. When the comparison does meet the predetermined criteria, the control circuit 106 further processes the message as determined by the contents of the recovered selective call message and the settings of controls 116. The selective call receiver 100 may further process the selective call message by presenting at least a portion of the selective call message, using the display 152, and by signaling a user via the sensible alerting device 118 that a selective call message has been received. The information which is displayed can include a short message such as a telephone number or a longer message such as a alphanumeric inquiry or a small map, any of which can be presented on the display 152 by manipulation of the controls 116 on the selective call receiver 100. It will be appreciated that the selective call receiver 100 could be of a type which includes a transmitter (not shown) which transmits messages and/or acknowledgments by means of radio signals.

The selective call receiver 100 is representative of many portable and mobile devices which can include a vibrator motor of the type disclosed by the present invention. Other such portable devices include portable and mobile telephones and portable and mobile communication transceivers such as trunked radios.

Figure 2:
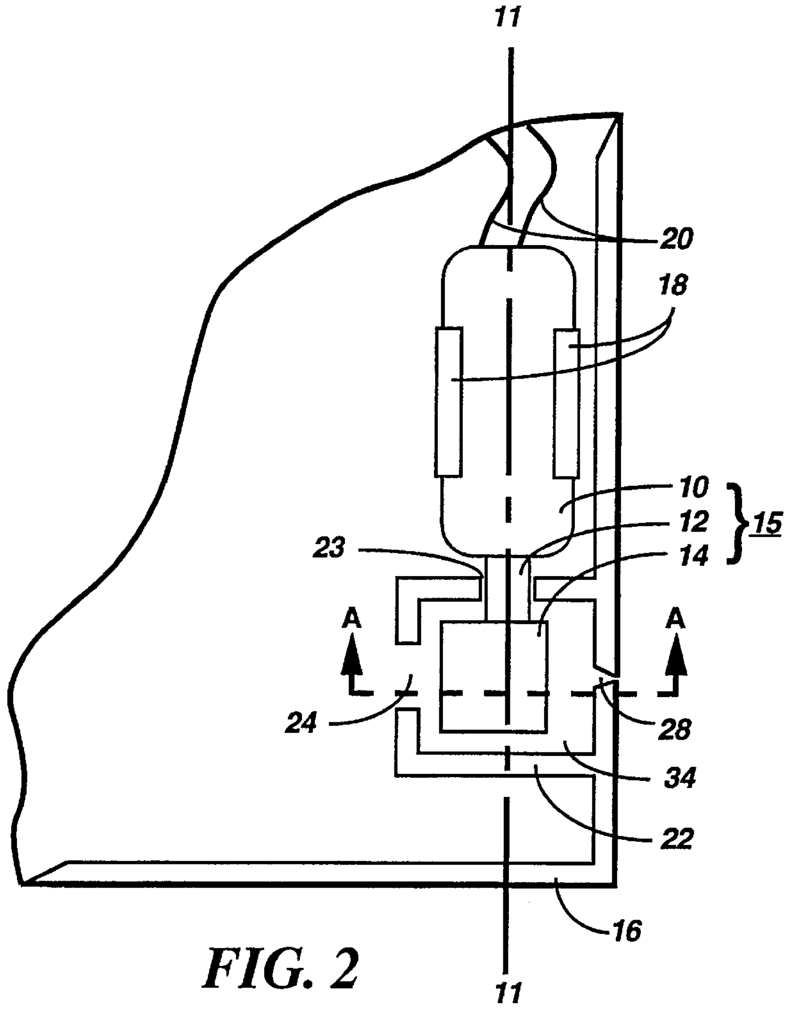
FIG. 2 is a view within a portion of a selective call receiver housing enclosing a vibrator motor which has been constructed in accordance with the first embodiment of the present invention.

Referring now to FIG. 2, an electric motor 10 is shown. The motor 10 is generally cylindrical in shape and includes a shaft 12 running through it's center along a first major axis 11. The shaft 12 rotates about a second axis 13 perpendicular to the first major axis 11 and the shaft 12 extends from one end of the electric motor 10 as shown. Attached to one end of the shaft 12 as shown is an unbalanced eccentric weight 14. The electric motor 10, the shaft 12 and the eccentric weight 14 together make up what is commonly known as a vibrator motor 15. The vibrator motor 15 of FIG. 2 is mounted within a housing 16 which contains the portable selective call receiver 100 of FIG. 1. The electric motor 10 is secured to the housing 16 with a bracket 18 so as to allow the shaft 12 and the eccentric weight 14 to rotate freely while the electric motor 10 is prevented from rotating. The bracket 18 can be a molded clip which securely holds the electric motor 10 to the housing 16. Alternately, the bracket 18 could secure the electric motor 10 to a portion of a printed circuit board used to support the selective call receiver 100. Electric power is supplied to the electric motor 10 through leads 20. Upon supplying power to the electric motor 10, the shaft 12 rotates about the second axis 13 as will the eccentric weight 14. Upon rotating the eccentric weight 14, vibration occurs since the eccentric weight 14 is unbalanced. The vibration is transferred to the housing 16 through the bracket 18. This allows a person carrying the selective call receiver to feel the vibration. This is a well known method of producing vibration using an electric motor 10.

Referring again to FIG. 2, there is shown a second housing compartment 22 which is internal to the housing 16. The housing 22 encloses the eccentric weight 14 within a chamber 34. An opening 23 in the housing 22 allows the shaft 12 to project through the side of the housing 22 and is constructed so as to allow the shaft 12 to rotate freely about the second axis 13. The housing 22 has a second opening 24 in one side thereof. The housing 22 has a common wall 26 that is shared with the housing 16. The common wall 26 is located in such a position so that the common wall 26 is exposed directly to the outside surface of the housing 16 enclosing the selective call receiver 100. Opening 28 is a sound producing orifice which is located within the common wall 26 and adjacent to the eccentric weight 14.

Figure 3:
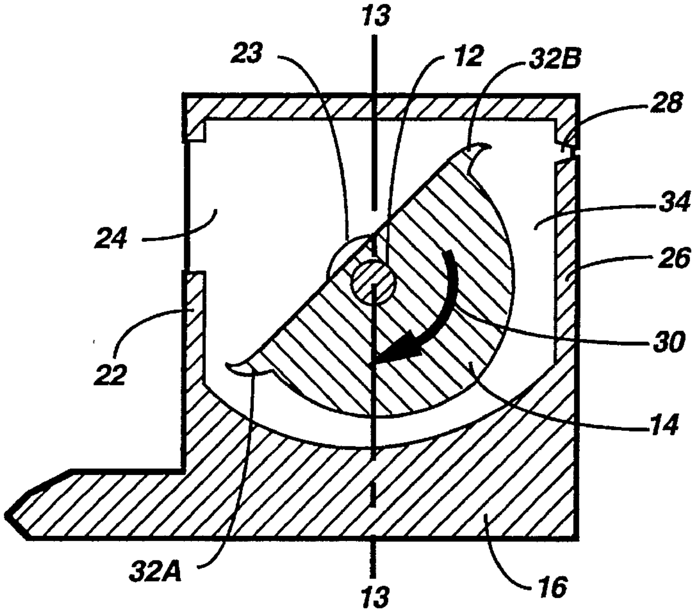
FIG. 3 is a cross-sectional view of FIG. 2 through section A—A.

Referring now to FIG. 3, the operation of the present invention will be described below. As explained above, upon supplying power to the electric motor 10, the eccentric weight 14 rotates about the axis 13 in the direction indicated by arrow 30. This will produce vibration which can be felt by the person carrying the selective call receiver 100. In response to the eccentric weight 14 rotating, the features 32(*a*) and 32(*b*) move air from the opening 24 into the chamber 34. The air is further moved through or across the sound producing orifice 28 which in turn produces an audible sound. The audible sound is projected outside the housing 16 which allows the audible sound to be detected by the person carrying the selective call receiver. As has been disclosed, the vibrator motor 15 now simultaneously produces vibration and an audible sound to alert the user of an incoming message. Since the generation of the audible sound is produced from the air moved by the features 32(*a*) and 32(*b*), no additional power is required to produce the audible sound as in the prior art.

Figure 4:
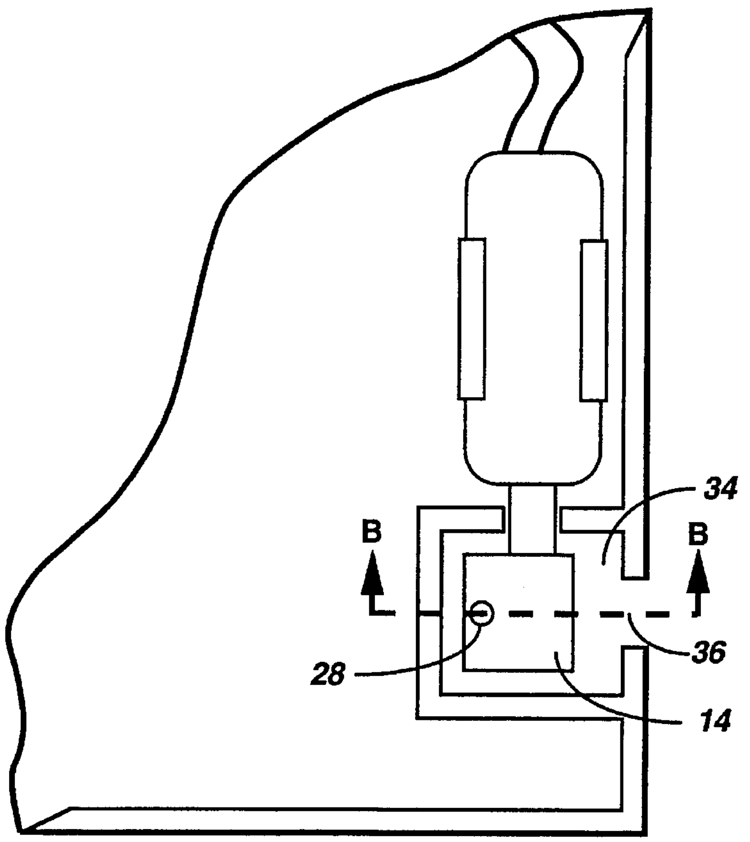
FIG. 4 is a view within a portion of a selective call receiver housing enclosing a vibrator motor which has been constructed in accordance with a second embodiment of the present invention.
Figure 5:
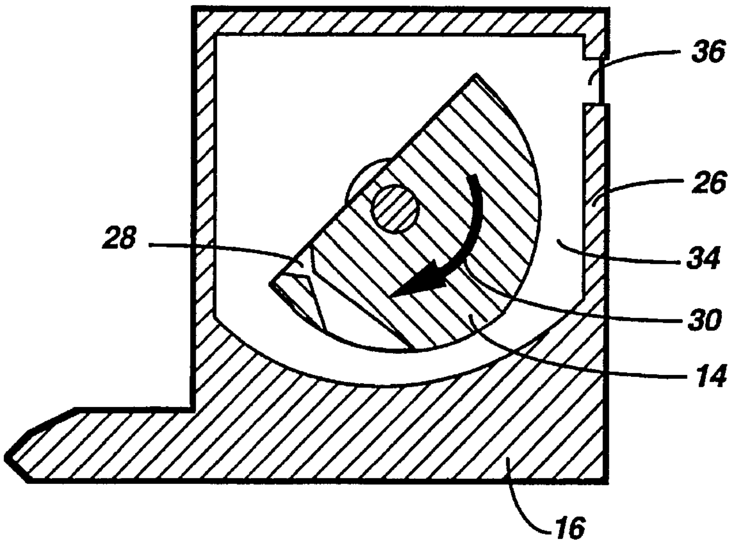
FIG. 5 is a cross-sectional end view of FIG. 4 through section B—B.

A second embodiment of the present invention is shown in FIGS. 4 and 5. In this case, the sound producing orifice 28 has been formed as an integral part of the eccentric weight 14. Upon rotating the eccentric weight 14 in the direction of the arrow 30 (shown in FIG. 5), the orifice 28 is passed through the air allowing air to pass through the orifice 28 to produce an audible sound. The common wall 26 includes a sound port 36 will allows the sound produced by the orifice 28 to be projected outside the housing 16, thereby allowing the audible sound to be detected by the person carrying the selective call receiver. The size of the chamber 34 can be set to produce a resonant cavity at the frequency of the audible sound generated, thereby enhancing the acoustic output or volume (SPL, sound pressure level).

Figure 6:
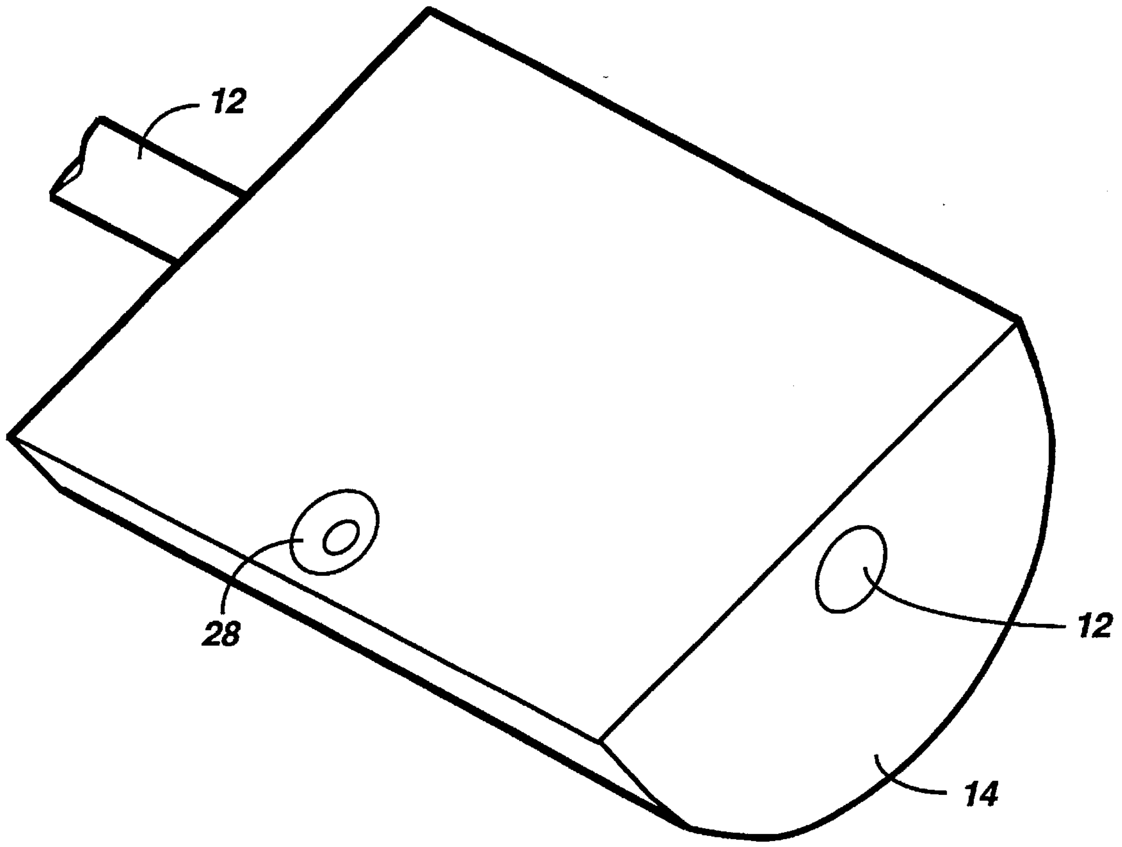
FIG. 6 is an enlarged perspective view of an eccentric weight of a vibrator motor in accordance with the second embodiment of the present invention.

FIG. 6 shows an enlarged perspective view of the eccentric weight 14 as constructed in accordance with the second embodiment of the present invention. As can be seen, the sound producing orifice 28 is shown as being formed as an integral part of the eccentric weight 14. It should be noted that the sound producing orifice 28 can be constructed using such known sound producing techniques as that of a vibrating reed or a tuned hollow cavity.

Figure 7:
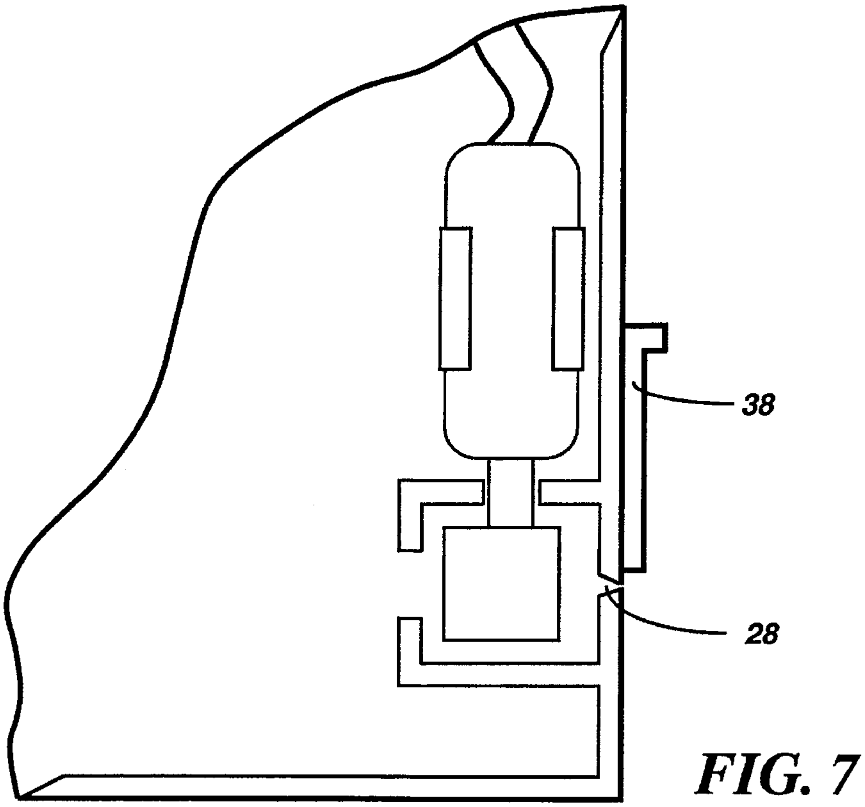
FIG. 7 and 8 are views within a portion of a selective call receiver housing enclosing a vibrator motor which has been constructed in accordance with a third embodiment of the present invention.
Figure 8:
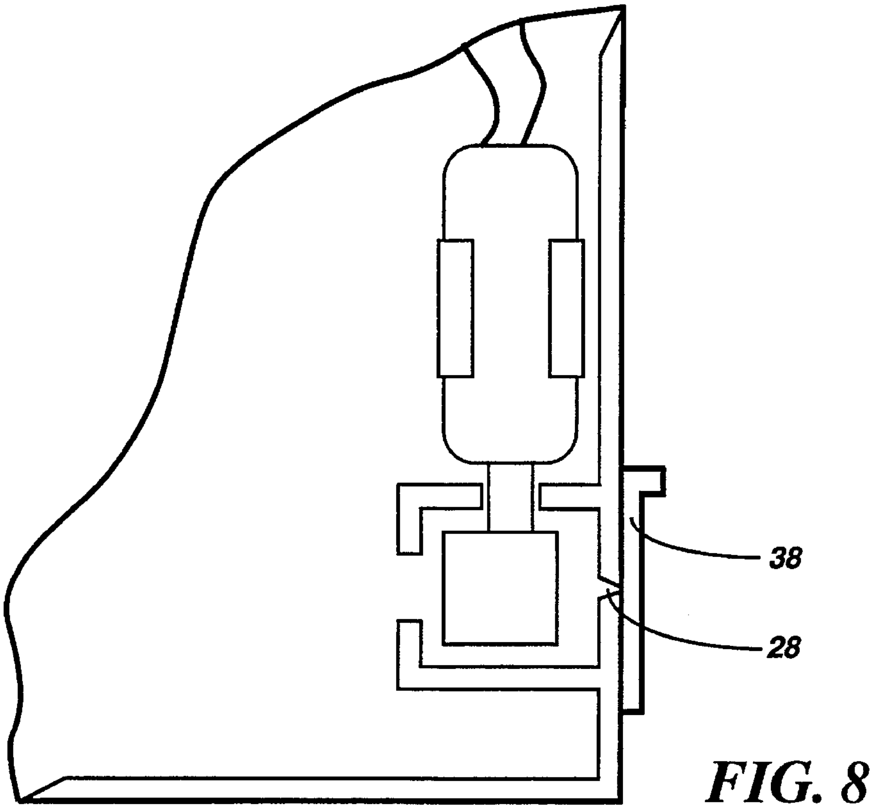

FIGS. 7 and 8 disclose a third embodiment of the present invention wherein the sound producing orifice 28 of FIGS. 2 and 3 can be covered by a door 38 so as to block the air movement through the orifice 28. FIG. 7 shows the door 38 in a first position which allows air to pass through the orifice 28. FIG. 8 shows the door 38 in a second position which prevents air from passing through the orifice 28. This effectively allows a user to selectively disable the generation of the audible sound while still being alerted by the vibration produced by the vibrator motor 15.

Figure 9:
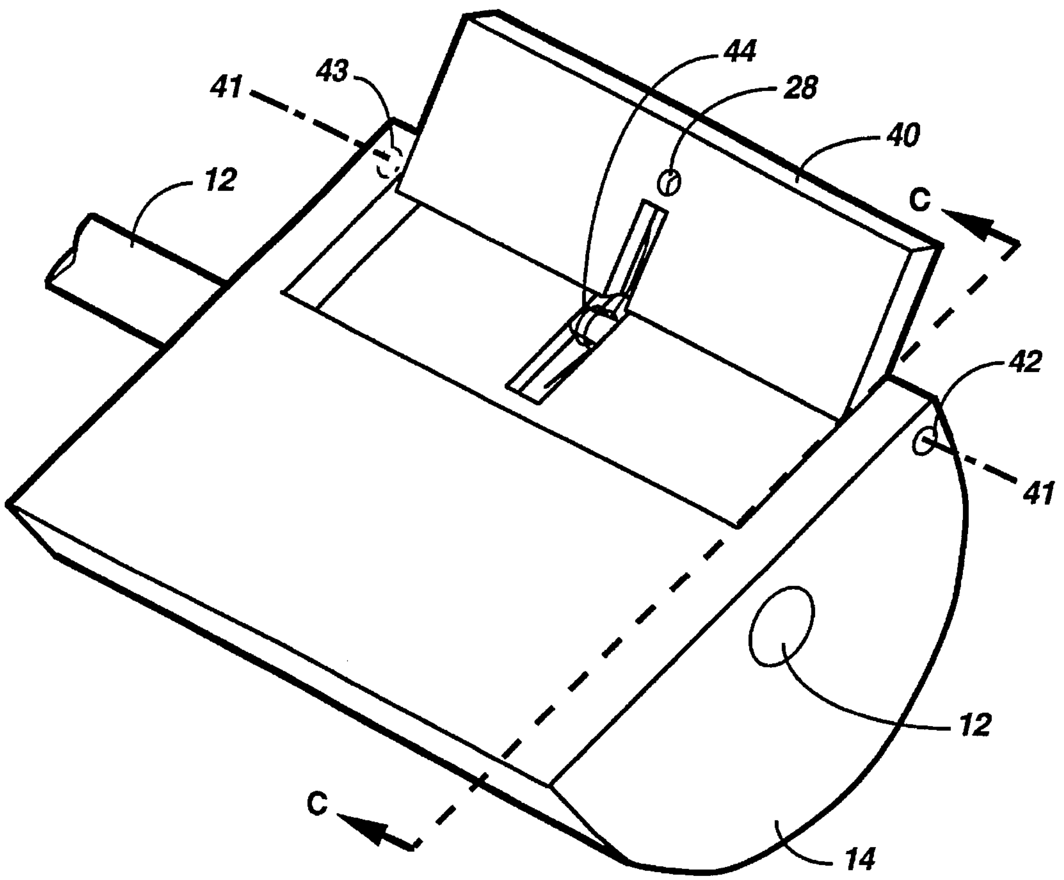
FIG. 9 is an enlarged perspective view of an eccentric weight of a vibrator motor in accordance with a fourth embodiment.
Figure 10:
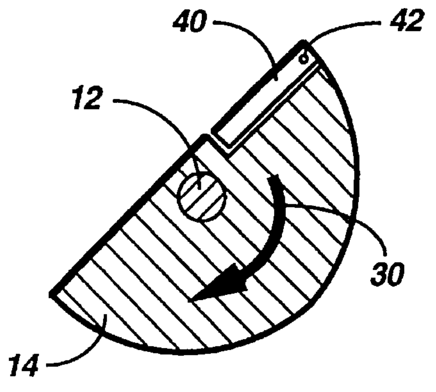
FIG. 10 and 11 are cross-sectional views of FIG. 9 through section C—C.
Figure 11:
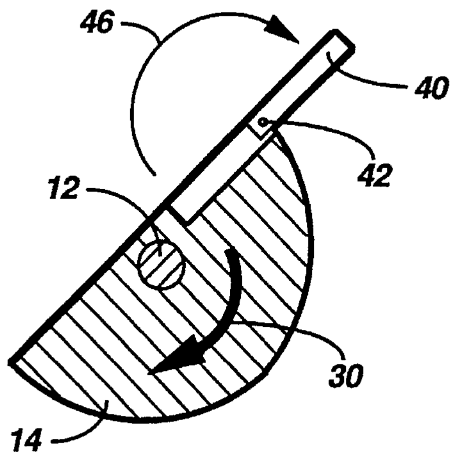

A fourth embodiment of the present invention is shown in reference to FIGS. 9, 10 and 11. It is well known that an electric motor will rotate at different speeds in response to corresponding different supply voltage levels. FIG. 9 shows an enlarged perspective view of the eccentric weight 14. The eccentric weight 14 includes a flap 40. The flap 40 includes a sound producing orifice 28. The flap 40 is rotatably attached to the eccentric weight 14 by a first pin 42 and a second pin 43 (not shown) along the axis 41. The flap 40 pivots about the axis 41 around the pins 42 and 43 and is held in a closed position by a spring 44 as shown in FIG. 10. The amount of force that the spring 44 exerts on the flap 40 is by way of example a force F. Upon supplying a first voltage level to the electric motor 10, the eccentric weight 14 rotates at a first speed in the direction indicated by the arrow 30 as shown in FIG. 10. However, the first speed is not fast enough to produce enough centrifugal force to overcome the force F of the spring 44 and the flap 40 would therefore remain in the closed position shown in FIG. 10. This first speed is, however, fast enough to produce vibration. Upon applying a second voltage level higher than the first voltage level, the eccentric weight 14 rotates at a second, faster speed. This second speed is fast enough to produce enough centrifugal force to overcome the force F exerted by the spring 44. The flap 40 will then pivot about the axis 41 provided by the pins 42 and 43 and move to an open position as indicated by the arrow 46 shown in FIG. 11. The open position allows air to pass through or across the orifice 28 so as to produce an audible sound. At the same time, the eccentric weight 14 is still producing vibration. Using the controls 116 of the selective call receiver 100, the user may select either the first or second voltage level that control circuit 106 will supply to the vibrator motor 15. The user can therefore selectively be informed of incoming messages with a vibratory alert or a simultaneous vibratory and audible alert. The control circuit 106 may also, depending on the type of incoming message that is detected, automatically supply the second, higher voltage so as to produce both types of alert in the case of emergency messages.

A fifth embodiment of the present invention is similar to the two-speed approach described in FIGS. 9–11 and will now be described with reference again to FIGS. 2 and 3. The control circuit 106 is programmed to supply a first and second voltage to produce a first and second speed as disclosed above. However, instead of using centrifugal force to enable the sound producing orifice 28 to operate, this embodiment would not allow the first speed to produce enough air movement through the orifice 28 of FIGS. 2 and 3 to produce an audible sound. The first speed would, however, be fast enough to produce a vibratory alert. The second faster speed would produce enough air movement through the orifice 28 to produce the audible sound. In addition, the vibrator motor 15 can be supplied with an even higher third voltage by the control circuit 106. As the eccentric weight 14 rotates even faster, the features 32(*a*) and 32(*b*) move greater quantities of air at a greater force through the orifice 28. This produces an audible sound at a higher volume level (SPL). The control circuit 106 can be programmed to vary the vibrator motor 15 voltage between the second and third levels so as to produce a first audible sound at a first volume and a second audible sound at a second, higher volume when the third voltage level is supplied. This would produce, as for example, a siren type effect which could indicate the receipt of an emergency message.

The present has been described with reference to specific embodiments which should not be construed as limiting. For example, the vibrator motor 15 could be any type of electric motor such as a low profile "pancake" motor that is well known in the art. There can be multiple sound producing orifice's incorporated in any of the embodiments described above wherein each orifice would produce a different audible sound. This would allow the present invention to produce a greater spectrum of audible sounds such as would be required for some persons who are tone deaf.

In summary, there has been described above a vibratory alerting device which can simultaneously produce an audible alert. As described above, the audible alert can also be selectively disabled so as to produce a vibrating alert only. Also as described above, the sound pressure level of the audible alert can be selectively changed, such as would be required in higher noise environments.

I claim:

1. An alerting device enclosed in a housing, for use in vibrating a communication device having a decoder for generating an alert signal in response to detecting received information, said alerting device comprising:

means for rotating a shaft about a first axis of rotation, the means for rotating being responsive to the alert signal for rotating said shaft;

an eccentric weight coupled to said shaft and capable of being rotated about said first axis to generate tactile vibration in the housing; and said eccentric weight coupled to an orifice for generating an audible alert by air movement produced in response to said eccentric weight being rotated about said first axis.

2. The alerting device of claim 1, wherein said orifice is adjacent to said eccentric weight.

3. A communication receiver enclosed within and coupled to a housing, said communication receiver including:

a receiver for receiving information;

decoding means responsive to received information for generating an alert signal in response thereof;

means for rotating a shaft about a first axis of rotation, the means for rotating being responsive to said alert signal for rotating said shaft;

an eccentric weight coupled to said shaft and capable of being rotated about said first axis to generate tactile vibration of the housing; and said eccentric weight coupled to an orifice for generating an audible alert by air movement produced in response to said eccentric weight being rotated about said first axis.

4. The communication receiver of claim 3, wherein said orifice is adjacent to said eccentric weight.

5. A method of producing a tactile and audible alert in a communication receiver, the communication receiver having a decoding means for generating an alert signal in response to detecting received information, said method includes the steps of:

(a) rotating an eccentric weight about an axis at a first rate in response to the alert signal;

(b) generating a tactile alert upon rotating the eccentric weight; and (c) generating an audible alert at an orifice coupled to the eccentric weight by air movement produced in response to the eccentric weight being rotated about the axis at the first rate.

* * * * *